Patented Jan. 13, 1931

1,789,122

UNITED STATES PATENT OFFICE

MAX JOSEPH THEUMANN, OF LYON, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS FOR COLORING CELLULOSE ESTERS AND ETHERS

No Drawing. Application filed February 9, 1928. Serial No. 253,204, and in Germany February 5, 1927.

In my co-pending specification Serial No. 209,398 there has been described a process of obtaining colored cellulose ethers and esters by means of mineral coloring matters, with which may be prepared varnishes, films, plastic materials of the celluloid kind, colored, transparent or translucent, the coloration of which is fast to light.

The present invention is an improvement in or modification of the invention claimed in the above specification.

According to this invention we have found that cellulose ethers and esters can be colored by the same process, by means of lakes of organic coloring matters, which have over these coloring matters the advantage of being but sparingly soluble in liquids such as water or alcohol. To this end, it suffices, in carrying out the process of the principal patent, to form the required lake in the midst of a solution of the cellulose ester or ether, instead of the mineral coloring matter.

The manner of carrying out the process, object of the invention, will be clearly understood from the following example which is not by any means limitative.

*Example.*—A solution of cellulose acetate in acetone is colored by means of eosine. To the homogeneous solution is progressively added, with stirring, a slight excess of lead acetate in aqueous solution. When the addition is completed, stirring is continued so as to obtain a homogeneous mass; the red-colored cellulose acetate is then precipitated, with water for instance, washed and dried. In this manner a red cellulose acetate is obtained with which varnishes, films or plastic materials may be prepared, the coloration of which resists the action of water.

What I claim and desire to secure by Letters Patent is:—

1. A process for the coloration of cellulose acetate in solution in acetone, consisting in adding eosine to the solution, adding lead acetate in aqueous solution and precipitating the red-colored cellulose acetate.

2. The method for the production of a colored organic derivative of cellulose of the ester or ether type which consists in forming in situ a lake in a solution of said cellulose derivative and then isolating the colored cellulose derivative.

3. The method for the production of a colored organic derivative of cellulose of the ester or ether type which consists in forming in situ a lake in a solution of said cellulose derivative and then precipitating the colored cellulose derivative in water.

4. A process for the coloration of a cellulose acetate which consists in adding eosine to a solution of the cellulose acetate, adding lead acetate and precipitating the colored cellulose acetate.

In testimony whereof I have signed my name to this specification.

MAX JOSEPH THEUMANN.